April 28, 1959   F. FLEMING   2,884,242
WELDING POSITIONERS
Filed Sept. 19, 1956   2 Sheets-Sheet 1
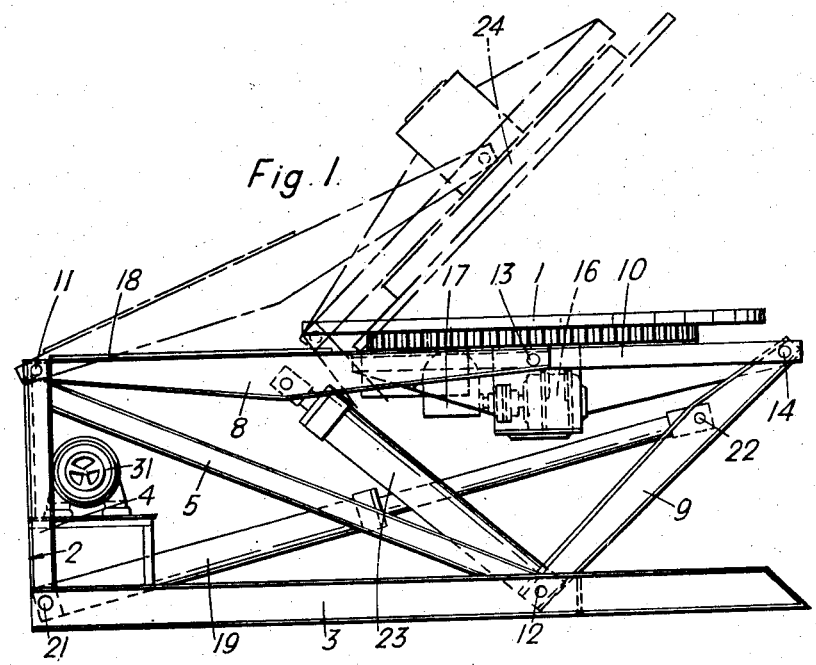
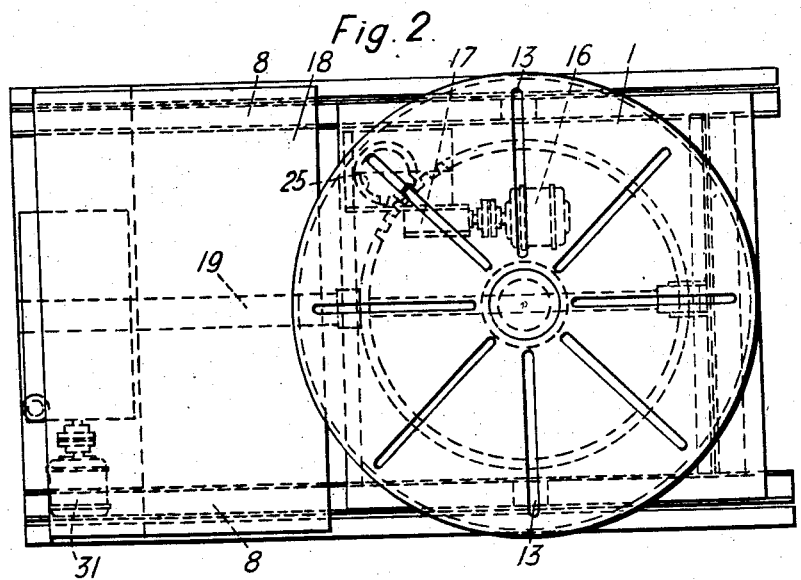
Inventor
FRED FLEMING
By Lee L. Bronsham
Attorney April 28, 1959     F. FLEMING     2,884,242
WELDING POSITIONERS
Filed Sept. 19, 1956     2 Sheets-Sheet 2
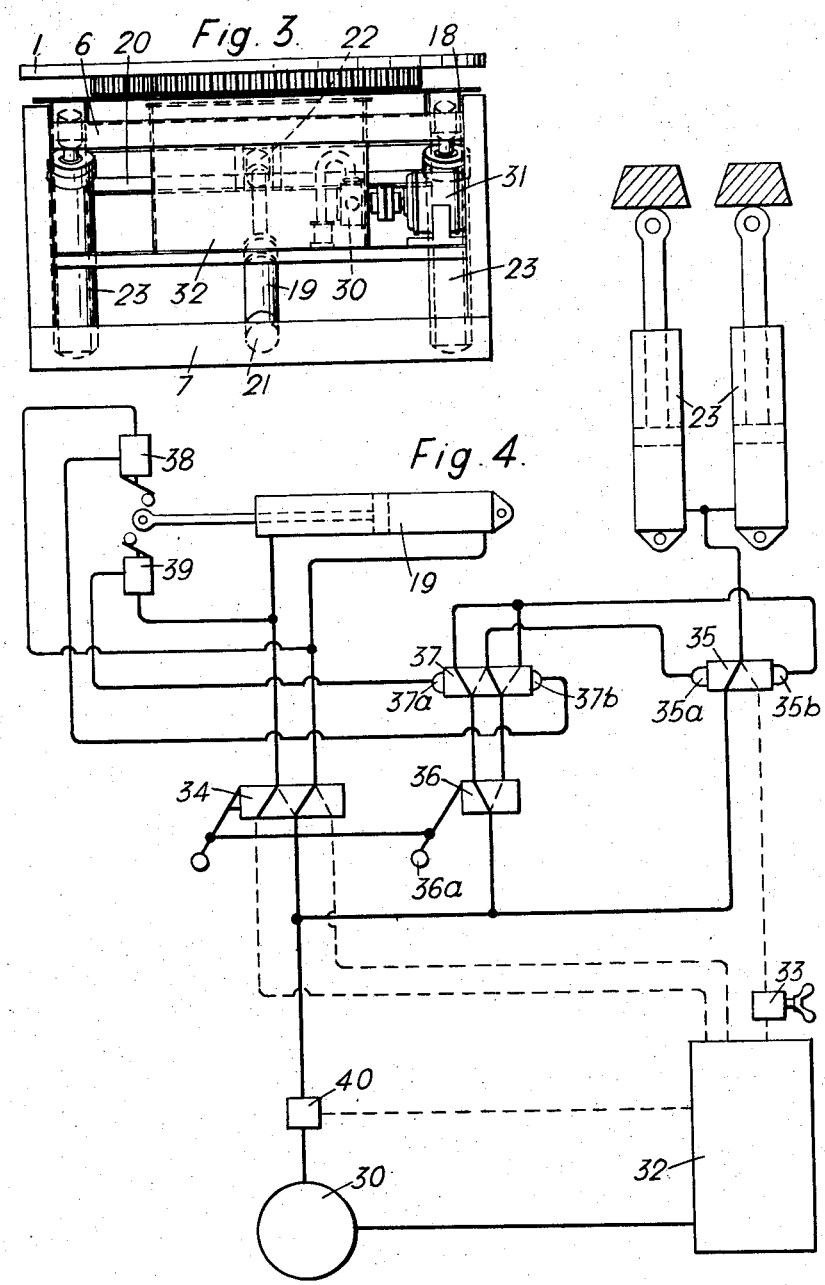
Inventor
FRED FLEMING

United States Patent Office 2,884,242
Patented Apr. 28, 1959

2,884,242

WELDING POSITIONERS

Fred Fleming, Rocester, England, assignor to The British Oxygen Company Limited, a British company Application September 19, 1956, Serial No. 610,751

Claims priority, application Great Britain September 20, 1955

5 Claims. (Cl. 269—185)

This invention relates to welding positioners, especially those adapted for heavy loads, of the kind having a table or work-support which is mounted for rotation about its own axis and is in addition capable of being given another rotational movement to tilt the table from the horizontal to the vertical plane and so vary the angle of the work; the exact amount of this tilting movement varies but 90° is usually considered essential and 135° is preferable.

The usual way in which this tilting movement is contrived is either to move the table from its normal horizontal position by tilting it downwards, so that when the table is in a vertical position the lower part of its periphery is of necessity much nearer the floor than before the tilting movement began, or by tilting about pivots higher than the plane of the table. This severely restricts the dimensions of work which the table can handle, and to counteract this it is usually arranged that the horizontal position of the table, which is the loading position, is rather higher than would otherwise be preferable, since a low loading position is more convenient.

According to the present invention the table or work-support is mounted so that it is in its lowest position when it is horizontal and is lifted up to higher levels in its tilting movements, so that the ground clearances increase as the table is tilted from the horizontal towards the vertical position.

This is achieved by supporting the table upon a pivotally movable linkage system which is in a depressed condition with the table horizontally and is constrained to rise up and lift the table when required while at the same time effecting the tilting of the table to the desired angle.

It is not desired to confine the invention to any particular design of linkage system as the desired result can probably be achieved in a variety of ways but it is possible to use a simple 4-bar kinematic chain based upon a pair of fixed pivots on a suitable supporting frame.

For example the frame may have an inclined upper face with one of the fixed pivots at ground level or thereabouts at one end of it and the other fixed pivot at the opposite end at the higher level.

Moreover it is not desired to confine the invention to any particular method of operating the linkage system although it will be apparent that some adequately powered means will be required and it is preferred to use fluid-pressure apparatus for the purpose.

For instance one or more hydraulic rams may be provided connected with the linkage system at a suitable point or points.

Preferably two rams are employed for the purpose acting together when the table is being lifted from a horizontal positions towards the vertical postion, but one ram acting to resist continued movement beyond the vertical position and also return reverse movement from the vertical position back to the horizontal again, when gravity is assisting the change in the angle of the table.

Preferably the rams are mounted internally within the linkage system.

Means are preferably provided to shut off the flow of operating fluid (hereinafter for the sake of convenience referred to as oil) and thereby lock the table at any required position.

The means for rotating the table about its own axis may be of any usual or suitable type and the motor and gearing for this purpose may be mounted below the table as usual, and may be supported upon the member of the linkage system which directly supports the table.

One construction of welding positioner according to the present invention will now be described by way of example with reference to the four figures of the accompanying drawings in which:

Figure 1 is a side elevation of the welding positioner with the worktable shown in loading position by full lines, and with the worktable shown in a displaced position by broken lines, Figure 2 is a plan view, and Figure 3 is an end view, of the welding positioner, and Figure 4 is a diagram of the fluid pressure system for tilting the worktable of the welding positioner.

Referring now to the drawings, and in particular to Figures 1, 2 and 3 thereof, a circular worktable 1 is supported by a base or frame structure 2 in such a manner as to be movable through an angle of 135° from the loading position shown in full lines to the fully tilted position shown by broken lines.

The base or frame structure 2 comprises a pair of generally right-angled triangular side frames each comprising a base member 3, an upright 4 at one end, and a sloping member 5 extending from the top of the upright 4 down to the opposite end of the base member 3 so forming the hypotenuse of this triangular side frame. The triangular side frames are spaced apart and joined by upper and lower cross beams 6 and 7 respectively. A first component 8 of a linkage structure is pivotally attached at 11 at the top of the hypotenuse 5, a second component 9 is pivotally attached at 12 at the bottom of the hypotenuse 5, and a third component is pivotally connected at 13 and 14 between the opposite ends of the first two components 8 and 9 respectively, and for the sake of convenience in description these three components 8, 9 and 10 will be hereinafter called respectively the first, second and third links, the fourth link in the 4-bar kinematic chain consisting of the base structure 2. It will be appreciated that the links are duplicated, each link being associated with one of the triangular side frames. The table 1 together with an electric motor 16 gearing 17 and a pinion 25 (seen in Figure 2) which effect rotation of the table 1 about its own central axis is mounted upon the third links 10. The links 8 are joined by a platform 18. A hydraulic ram 19 of double-acting type is pivotally anchored at 21 to the lower cross beam 7 of the base structure and at 22 to a cross bar 20 joining the second links 9. Two further hydraulic rams 23 each of single-acting type are also pivotally anchored one at each side of the base structure 2 at the pivots 12 and connected to the adjacent front link 8. It is preferable that the pivot anchorages 21 and 12 of the double acting and single acting rams 19 and 23 respectively are rather wide apart: thus in the construction shown the double acting ram 19 is pivoted at 21 in the right-angle of the base structure 2 and the single-acting rams 23 at the opposite end of the base members 3.

Tilting of the worktable 1 is effected by a fluid pump 30 which is arranged to be energised by an electric motor 31 to draw oil from a reservoir 32 and supply it under pressure to the hydraulic rams.

In the horizontal position of the table 1 which is preferably the loading position, the first and third links 8 and 10 are almost in a straight-line horizontal position extending outwardly beyond the pivot points 12 of the bottom ends of the second links 9 which extend outwardly from these pivots at approximately 45° upwardly towards the third links 10. From this position the operation of the rams 19 and 23 simultaneously pulls the second links 9 inwards towards the vertical and pushes the first links 8 upwards towards the vertical. This action acts on the third links 10 carrying the table 1 and swings the third links 10 in the opposite direction upwards towards the vertical. Eventually, if the movement is continued, the point is reached when the second and third links 9 and 10 respectively have straightened out into a straight vertical line, or nearly so, having thereby caused the table 1 to be bodily lifted and at the same time to have partaken of a tilting movement through about 90° upwards towards the vertical position. This same tilting movement can be continued beyond 90°, over the top dead centre position of links 9 and 10, for a further 45° tilt of the table to the position shown by broken lines at 24 by continued action of the rams 19 and 23, but in this additional 45° of movement of the table the single-acting rams 23 are arranged to oppose the tilting movement. At all stages in its movement the table 1 is positively held, together with any load supported thereon, by the linkage system and by the rams, and the table can be arrested and locked in any desired position by shutting off the supply of oil which is arranged to actuate the rams. The parts move in the reverse directions from those described when the table makes its return movement from the 45° underhand position back to the vertical and then over top dead centre and back down to the horizontal or unloading position, all under ram control. Referring now to Figure 4 of the drawings in which pressure lines are shown in full lines and exhaust lines are shown in broken lines, oil is supplied from the reservoir 32 by the pump 30 capable of exerting a considerable pressure to both single and double acting rams 23 and 19 respectively to raise the linkage and worktable 1 from the horizontal. When the second and third links 9 and 10 reach top dead centre, that is when the single acting rams 23 applying force to the first links 8 has completed its upward stroke, the pressure supply to these rams only is cut off and the oil in these rams allowed to flow to exhaust through a metering valve 33 which is adjustable to suit the desired rate of descent of the worktable 1. The direction of tilting of the worktable 1 (that is either forward to 45° below the horizontal or reverse returning to the horizontal) is dependent upon the direction of operation of the double-acting ram 19 connected to the second links 9 and controlled by a 3-position lever-operated directional control valve 34, hereinafter called the main valve. By this valve 34 the cycle of operation may be arrested with the worktable in any intermediate position between horizontal and 45° below the horizontal, and may be reversed. The control of the single acting rams 23 is effected by means of a pilot-operated spring self-centering directional control valve 35 having 3 positions. A supply of fluid under pressure is always available from the pump 30 at this valve but is allowed to pass to the single acting rams 23 only when required. Unless receiving a pressure impulse at either of two opposite pilot ports 35a and 35b this valve will close under the action of the self-centering spring and the single acting rams will be locked. Pressure pilot supply to either of the pilot ports 35a and 35b is derived from a constant main source which passes through a 3-position lever-operated directional control valve 36, which is mechanically linked to the main valve 34, so as to imitate its operation. This valve 36 provides two alternative paths for the pilot pressure to approach valve 35a, or cuts off this pilot pressure, depending on the position of its lever 36a. When the main valve 34 is off and no oil can pass in or out of the double acting ram 19, no impulse can pass to valve 35, which will close and lock the single acting rams 23 in position. The alternative pilot paths from valve 36 both pass through a further pilot operated directional control valve 37, which has two positions governed by pilot pressure admitted to ports 37a and 37b at its ends. The function of this valve 37 is to change over the direction of the pilot pressure supply passing from valve 36 to valve 35 and the valve operates under pilot pressure from either of two cam-operated spring-return pilot valves 38 and 39 which are actuated by cams mounted on the linkage but not shown in the drawings as the second and third links 9 and 10 pass top dead centre. The pilot pressure supply to these cam operated valves is tapped from the feed lines to the double acting ram 19 from the main control valve 34, so that although both pilot valves 38 and 39 are actuated at top dead centre, the impulse received at valve 37 will be that from the pilot valve 38 or 39 corresponding to the direction of movement of the double acting ram 19. The effect of this impulse is to change over valve 37 and to reverse the previous impulse given by valve 36 to valve 35, consequently changing over valve 35. It will be seen then that the single acting ram pilot operated control valve 36 is automatically controlled either by changing over the main valve 34 to which it is mechanically linked or by actuation of the appropriate cam-operated pilot valve when the linkage is passing top dead centre. Thus the action of both single and double acting rams, 23 and 19 respectively, is interlocked, providing positive and safe control of the load at all times. The circuit is protected by a relief valve 40 fitted between the pump and the main feed lines which limits the working pressures to a safe maximum.

While it is not impossible that alternative and perhaps simpler methods of controlling the mechanism may be devised, positive control over the rams at all times under variable and varying loads is essential.

Other means for applying force to operate the linkage may also be used, for example power-operated screws.

I claim:

1. A welding positioner comprising a work support adapted for rotation about an axis perpendicular to the plane of the work support, a base member, a pair of horizontally spaced pivots on said base member, a pivotally movable linkage system adapted to support said workpiece for tilting movement from a lower position in which said work support is horizontal to and beyond a raised position in which it is vertical and at a higher level, consisting of two outer links, one connected to each spaced pivot, and a third link adapted to support said work support and pivotally connected to said two outer links away from said pivots which are so spaced horizontally that a vertical line through the centre of gravity of the work support is between them for the greater part of said tilting movement from said lower position to said raised position, and an operating system for the linkage system comprising hydraulic rams connected between said base member and each of said outer links and adapted to rotate said outer links about their adjacent spaced pivot, whereby tilting of said work support may be effected.

2. A welding positioner especially adapted for heavy loads, comprising a work support adapted to rotate about an axis perpendicular to the plane of the work support, a base structure comprising a pair of parallel side frames, a pair of first pivotal points on said side frames, a pair of second pivotal points on said side frames spaced horizontally from and at a higher level than said pair of first pivotal points, a pivotally movable linkage system supporting said work support and consisting of a pair of four-bar kinematic chains based on said first and second pivotal points, said four-bar kinematic chains comprising a pair of first links pivotally mounted on said pair of second pivotal points, a pair of second links pivotally mounted on said pair of first pivotal points, a pair of third links carrying said work support and pivotally connected between said pair of first links and said pair of second links, and the fourth link of each of said kinematic chains consisting of said side frames, and linkage operating means connected between base structure and said linkage system and adapted to tilt said work support upwardly through at least 90 degrees from the horizontal position of said work support.

3. A welding positioner especially adapted for heavy loads, comprising a work support adapted to rotate about an axis perpendicular to the plane of the work support, a base structure comprising a pair of parallel side frames, a pair of first pivotal points on said side frames, a pair of second pivotal points on said side frames spaced horizontally from and at a higher level than said pair of first pivotal points, a pivotally movable linkage system supporting said work support and consisting of a pair of four-bar kinematic chains based on said first and second pivotal points, said four-bar kinematic chains comprising a pair of first links pivotally mounted on said pair of second pivotal points, a pair of second links pivotally mounted on said pair of first pivotal points, a pair of third links carrying said work support and pivotally connected between said pair of first links and said pair of second links, and the fourth link of each of said kinematic chains consisting of said side frames, and linkage operating means connected between said base structure and said linkage system comprising two single acting hydraulic rams adapted to pivot said pair of first links about said pair of second pivotal points, and a double acting hydraulic ram adapted to pivot said pair of second links about said pair of first pivotal points, whereby said work support is tilted upwardly through at least 90 degrees from the horizontal position of said work support.

4. A welding positioner comprising: a work support adapted for rotation about an axis perpendicular to the plane of the work support; a base member; a pair of horizontally and vertically spaced pivots on said base member; a pivotally movable linkage system, adapted to support said work support for tilting movement from a lower position in which said work support is horizontal to and beyond a raised position in which it is vertical and at a higher level, consisting of two outer links, one connected to each spaced pivot, and a third link pivotally connected to said outer links away from said spaced pivots and adapted to support said work support; and an operating system for the linkage system comprising two hydraulic rams, each hydraulic ram being connected between said base member and one of said outer links, and both being adapted to rotate said outer links about their adjacent spaced pivots to tilt the work support, said two hydraulic rams being adapted to act together when said work support is being lifted from the horizontal towards the vertical position but one hydraulic ram being adapted to resist continued movement beyond the vertical position, and one hydraulic ram being adapted to resist movement of said work support from the vertical towards the horizontal position.

5. A welding positioner as claimed in claim 4, wherein means is provided to shut off the flow of operating fluid to said hydraulic rams and thereby lock said work-support in any required position.

References Cited in the file of this patent
UNITED STATES PATENTS

| 1,936,984 | Listebarger | Nov. 28, 1933 |
| 2,469,644 | Harrison | May 10, 1949 |
| 2,483,811 | Cullen | Oct. 4, 1949 |